Patented Oct. 17, 1950

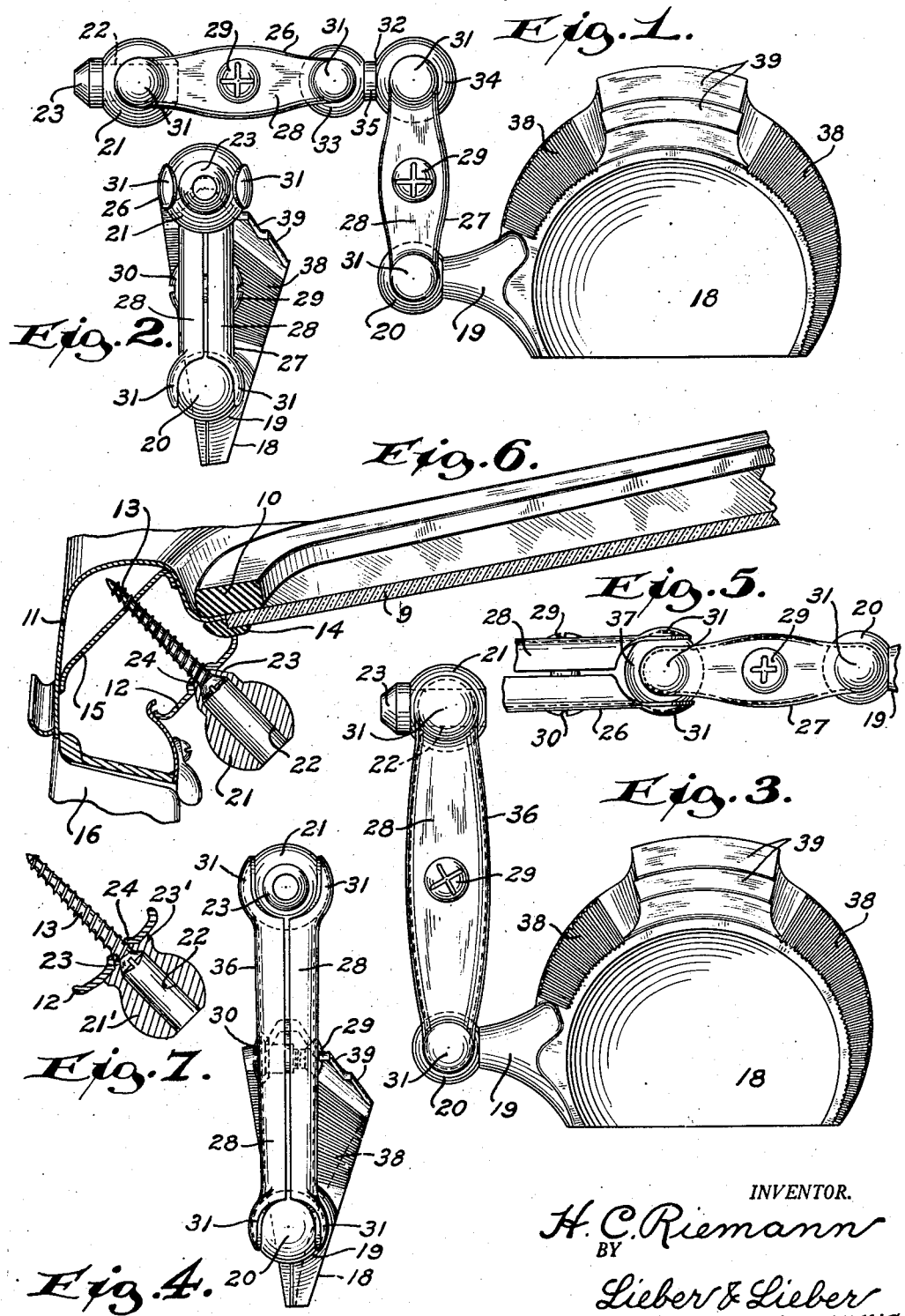

2,526,045

UNITED STATES PATENT OFFICE 2,526,045

VEHICLE ACCESSORY MOUNTING

Howard C. Riemann, West Allis, Wis., assignor to The Fulton Company, West Allis, Wis., a corporation of Wisconsin Application October 1, 1948, Serial No. 52,369

5 Claims. (Cl. 287—21)

1

The present invention relates generally to improvements in automobile accessories and mountings therefor, and relates more particularly to improvements in the construction and operation of traffic signal detectors for automobiles having outside sun visors associated with the windshield thereof.

The primary object of my present invention is to provide an improved mounting for accessories applied to the windshields of modern vehicles, which can be firmly attached and subsequently conveniently adjusted to position the suspended accessories in any desired position.

In road vehicles having outside opaque protective visors associated with the transparent windshields thereof, it is difficult for the drivers to see traffic signals disposed at intersections and at considerable heights above the roadways; and in order to obviate this difficulty, it has heretofore been customary to utilize so-called traffic light or signal finders each consisting of a transparent moon-shaped lens adapted to be attached to the lower inside left-hand corner of the windshield pane with the aid of a flexible suction cup. These suction cup supports were necessarily also adhesively secured to the windshield glass since the suction action afforded by the rubber cups was not sufficient to firmly hold them in place; and while limited rotary adjustment between the lens and the supporting cup was provided for in some of these previous accessories, such adjustment was not sufficient to accommodate drivers of various sizes without requiring them to assume annoying changes in position in order to observe the traffic signals with the aid of these prior lenses.

It is therefore an important object of the present invention to provide an improved mounting for such traffic light detector lenses, whereby the accessories may be more effectively attached to the vehicles and thereafter readily adjusted to suit variable observation conditions and to accommodate any driver.

Another important object of this invention is to provide a simple and durable universally adjustable windshield accessory support which will firmly hold the suspended device in any desired position of adjustment, and wherein such adjustment may be quickly effected without removing and replacing any of the fastening elements.

A further more specific object of the invention is to provide an improved traffic signal detecting unit in which the observation lens can not only be adjusted by rotation thereof in a plane parallel to the transparent windshield, but may also be

2 adjusted to vary the angularity thereof relative to the plane of the windshield and to position it nearer to or farther away from the windshield surface or at various localities throughout an extensive area of the latter; while still being bodily removable whenever desired, from the driver's vision through the transparent shield.

Still another specific object of my invention is to provide an improved mounting bracket for accessories associated with a vehicle windshield, which may be rigidly secured to the body of the vehicle with the aid of one or more of the normal fastening screws for holding the windshield in place, and which besides being flexible in use, also presents a neat and highly attractive appearance.

An additional specific object of this invention is to provide a highly decorative traffic signal finder lens assembly which is effectively cooperable with the variably inclined, flat or curved windshields of old and new automobile models, and wherein the lens and windshield views are not undesirably obstructed at any time.

These and other specific objects and advantages of my present invention will be apparent from the following detailed description.

A clear conception of several typical embodiments of the dominant features of my present improvement, and of the mode of attaching and utilizing the improved traffic light detectors, may be had by referring to the drawing accompanying and forming a part of this specification wherein like reference characters designate the same or similar parts in the various views.

Fig. 1 is a plan view of a traffic light finder assemblage embodying a multiple link mounting bracket;

Fig. 2 is an end view of the multiple link assembly of Fig. 1, looking toward the mounting bracket;

Fig. 3 is a plan view of a traffic light finder unit embodying a single link mounting bracket;

Fig. 4 is an end view of the single link assembly of Fig. 3, also looking toward the mounting bracket;

Fig. 5 is a fragmentary view showing a modified mode of connecting the links of a multiple link mounting bracket such as shown in Figs. 1 and 2;

Fig. 6 is a transverse section through a fragment of a standard automobile windshield and adjacent vehicle structure, showing the manner in which my improved accessory brackets are attachable thereto; and Fig. 7 is a central section through a modified mounting ball for the accessory supporting bracket.

While the improved windshield accessory mounting brackets have been shown and described herein as being of a particular type, it is not my desire or intent to unnecessarily limit the utility of the improved features by virtue of this restricted disclosure; and it is also contemplated that specific descriptive terms employed herein be given the broadest possible interpretation consistent with the disclosure.

Referring to Figs. 6 and 7 of the drawing, most standard automobiles are now provided with an upwardly and rearwardly inclined transparent front windshield 9 the outer marginal edge of which snugly engages a flexible molding 10 secured to the vehicle body and to the side or corner posts 11 of the metal body, the glass windshield 9 being detachably confined in normal position by means of inside moldings or clamping strips 12 secured in place by a plurality of screws 13 and coacting with a flexible sealing strip or band 14 which engages the inner marginal edge of the windshield pane. The interior of each side post 11 of the metal vehicle body, is reinforced by an internal normally concealed plate 15 into which the self-tapping screws 13 are adapted to be driven as illustrated, in order to firmly clamp the strips 12 in place; and the side doors 16 of the vehicle normally cooperate with the posts 11 to provide an enclosure for the driver. Many of these standard vehicles are also provided with outside visors attached to the bodies and disposed forwardly of and above the windshields 9, and when such visors are present, it is frequently difficult for the vehicle driver to observe traffic signals located considerable distances above and centrally of highway intersections; and in order to obviate this difficulty, it has been customary to utilize traffic light finders secured to the inner lower left hand corners of the windshields 9.

The present invention relates primarily to an improved construction and mounting for such traffic signal observation lenses, and in accordance with Figs. 1 to 5 inclusive, I provide each accessory or transparent lens 18 with an integral rigid lateral projection 19 having a sphere or ball 20 formed integral with its outer end. I also provide a mounting ball 21, 21' of special construction for each lens 18, each mounting ball having a central through opening or bore 22 and an integral inwardly direct frustro-conical flange 23 at one end of the bore 22 as shown in section in Figs. 6 and 7, and this ball 21, 21' is adapted to be connected to the lens ball 20 in various ways so as to permit universal adjustment of the accessory or lens 18 in any direction relative to the adjacent windshield 9. In Fig. 7, the mounting ball 21' is also provided with an outwardly directed flange 23' merging into the tapered flange 23 thereof, and adapted to flatly engage the adjacent strip 12. The integral frustro-conical flange 23 of each mounting ball 21, 21' is tapered at an angle of about forty-five degrees relative to the ball axis, and the ball 21, 21' may be firmly attached to one of the likewise tapered sockets 24 of the clamping strip 12 with which a screw 13 normally coacts, by removing the selected screw 13 and by subsequently replacing it through the bore 22 of the ball 21 so as to cause the tapered screw head to firmly clamp the tapered flange 23 within the tapered socket 24 as depicted in Figs. 6 and 7.

The universal connection between each mounting ball 21 and the corresponding lens ball 20 may assume a variety of forms, and in Figs. 1 and 2 the mounting bracket for the lens 18 comprises two similar composite links 26, 27 each consisting of a pair of interchangeably similar elongated trough shaped sheet metal elements 28 the medial portions of which are spaced apart but are detachably and adjustably interconnected by means of a screw 29 coacting with a sleeve nut 30, while their opposite ends 31 are spherically cup shaped and adapted to snugly frictionally engage the balls 20, 21 and an intervening knuckle member 32. The knuckle member 32 of Figs. 1 and 2 consists of a pair of coaxial spheres 33, 34 integrally united by a neck portion 35, and the adjacent socketed ends 31 of the links 26, 27 are snugly frictionally cooperable with the spheres 33, 34 respectively. When this lens and mounting have been properly constructed and assembled, the link 26 may obviously be swung in any direction relative to the mounting ball 21 and the sphere 33 of the knuckle member 32 may likewise be swung in any direction relative to the swinging end of the link 26; while one end of the other link 27 may be swung in any direction relative to the other sphere 34 of the knuckle member 32 and the lens ball 20 may be swung in any desired direction relative to the opposite end of the link 27.

In the assemblage of Figs. 3 and 4, a single somewhat longer link 36 composed of two elongated sheet metal spaced elements 28 the medial portions of which are likewise interconnected by a screw 29 and a sleeve nut 30 and the opposite ends 31 of which are also spherically cup shaped, is utilized to directly connect the fixed mounting ball 21 with the adjustable lens ball 20, thus avoiding the use of a knuckle member and a second link. When this simplified assemblage has been properly constructed, the single suspension link 36 may be swung in any desired direction about the stationary mounting ball 21 and the lens ball 20 may also be swung in any desired direction relative to the swinging end of the link 36, thus providing for somewhat more limited but still universal adjustment of the lens 18 with respect to its mounting ball 21. In the modified assembly of Fig. 5, the knuckle member 32 of Figs. 1 and 2 has been replaced by a single ball of sphere 37 coacting with the adjacent cupped ends 31 of both links 26, 27, and while this knuckle ball or sphere 37 affords somewhat less relative movement between the links 26, 27 than is provided for by the knuckle member 32, it still permits considerable universal adjustment of the lens 18.

All of the links 27, 27, 36 are preferably formed of resilient material such as sheet metal, and the frictional clamping action between the cupped ends 31 of these links and the intervening balls or spheres, may be conveniently varied by manipulating the screws 29 and sleeve nuts 30 so as to draw the spaced elongated trough shaped link elements 28 together more or less, and to thereby firmly hold the parts of each mounting bracket in the desired positions of adjustment. The mounting ball 21 and the knuckle member 32 or sphere 37 when used, are preferably formed of metal; but the lens 18 is formed of transparent material such as glass or plastic, and has one face cupped while its opposite face is plane, and this lens may be provided along its opposite sides with clear view serrations 38 while its upper peripheral portion has a series of arcuate steps 39 formed thereon and adapted to bear the identity of the manufacturer. When the mounting ball 21 has been fastened to one of the attaching screws 13 near the inner lower left hand corner of the windshield 9, the flat lens 18 may be conveniently manually adjusted to any desired position along the inner surface of the windshield pane or at any desired angle relative to the plane of the windshield surface so as to properly accommodate any driver; and after desired adjustment has been effected, the lens 18 will be firmly retained in adjusted position by the resilient clamping elements 28.

From the foregoing detailed description of the construction and mode of use of my improved traffic light finder, it should be apparent that I have provided a simple and readily adjustable unit which may be effectively attached to the vehicle body independently of the transparent windshield pane, and without resorting to the use of less reliable attachments such as suction cups. The mounting ball 21 is an important feature of the invention since it may be readily firmly applied to the vehicle body without marring the structure, and may likewise be just as readily removed; and this mounting ball 21 may be utilized for the attachment of various other accessories associated with the windshields of automobiles or the like. The composite suspension links which are interposed between the mounting ball 21 and the lens 18, permit universal adjustment of the lens to suit various drivers, and effectively hold the lens 18 in various positions of adjustment. The improved formation of the lens 18 with its supporting arm at the left side thereof, minimizes the obstruction to the driver's view, and the resilient links 26, 27, 36 may be readily produced with the aid of simple punches and dies.

The improved assemblages shown by way of illustration have all proven highly satisfactory and successful in actual use, and are conveniently attachable to practically all modern vehicle bodies with the aid of an ordinary screw driver. They produce a neat and highly finished appearance, and are far more flexible in use than the former traffic light finders which were attached directly to the windshields, while adjustment of the clamping pressure exerted by the link elements 26 may also be easily effected with an ordinary screw driver applied to the adjusting screws 29. The improved mounting brackets moreover permit the lenses or accessories suspended therefrom to be swung entirely clear of the windshields 9 for cleaning purposes or when the traffic signal detector is not in use; and the adjustability of the angularity of the lens 18 relative to the windshield plane, is frequently desirable and can be conveniently effected with the present improvement.

It should be understood that it is not desired to limit this invention to the exact details of construction and to the precise mode of use of the automobile accessory mounting bracket herein shown and described, for various modifications within the scope of the appended claims may occur to persons skilled in the art.

I claim:

1. In a vehicle accessory mounting, a ball having an integral radial external projection pierced by a small opening, said ball also having a larger diametral hole merging with and extending from the small opening through the ball to provide an inwardly directed flange surrounding the small opening, a fastening element for the ball extending outwardly through the small opening and having a head clampingly engageable with the inner surface of said flange, and an accessory supporting arm having opposed spherical zone socket portions frictionally engaging the periphery of the ball.

2. In a vehicle accessory mounting, a ball having an integral radial external projection pierced by a small opening, said ball also having an internal tapered surface and a larger diametral hole merging therewith and extending from the small opening through the ball to provide an inwardly directed flange bounded by said surface and surrounding the small opening, a fastening element for the ball extending outwardly through the small opening and having a head clampingly engageable with said tapered surface of said flange, and an accessory supporting arm having opposed spherical zone socket portions frictionally engaging the periphery of the ball.

3. In a vehicle accessory mounting, a ball having an integral radial external projection pierced by a small opening, said ball also having a larger diametral hole merging with and extending from the small opening through the ball to provide an inwardly directed flange surrounding the small opening, a fastening element for the ball extending outwardly through the small opening and having a head clampingly engageable with the inner surface of said flange, and an accessory supporting arm composed of two resilient sections having opposed spherical zone socket portions frictionally engaging the periphery of the ball on opposite sides of the latter.

4. In a vehicle accessory mounting, a ball having an integral radial external projection pierced by a small opening, said ball also having a larger diametral hole merging with and extending from the small opening through the ball to provide an inwardly directed flange surrounding the small opening, a fastening element for the ball extending outwardly through the small opening and having a head clampingly engageable with the inner surface of said flange, an arm having a pair of opposed spherical zone socket portions at one end frictionally engaging the periphery of the ball and also having another pair of opposed spherical zone socket portions at its opposite end, and an accessory supporting knuckle clampingly engaged by said other socket portions.

5. In a vehicle accessory mounting, a ball having an integral radial projection pierced by a small opening, said ball also having an internal tapered surface and a larger diametral hole merging therewith and extending from the small opening through the ball to provide an inwardly directed flange bounded by said surface and surrounding the small opening, a fastening screw for the ball having a threaded shank extending outwardly through the small opening and also having a tapered head clampingly engageable with said tapered flange bounding surface, and an accessory supporting arm having opposed spherical zone socket portions frictionally engaging the periphery of the ball.

HOWARD C. RIEMANN.

REFERENCES CITED

The following references are of record in the file of this patent:

UNITED STATES PATENTS

| Number | Name | Date |
| --- | --- | --- |
| 1,731,284 | Andel et al. | Oct. 15, 1929 |
| 1,806,059 | Hoople | May 19, 1931 |
| 1,861,148 | Withrow | May 31, 1932 |
| 1,933,333 | Morgan | Oct. 31, 1933 |